(12) United States Patent
Hale

(10) Patent No.: US 10,449,868 B2
(45) Date of Patent: Oct. 22, 2019

(54) BATTERY SYSTEM COMPRISING A CONTROL SYSTEM

(71) Applicant: Upgrade Technology Engineering Ltd., Potters Bar Hertfordshire (GB)

(72) Inventor: Christopher J. Hale, Potters Bar Hertfordshire (GB)

(73) Assignee: UPGRADE TECHNOLOGY ENGINEERING LTD., Potters Bar Hertfordshire (GB)

( * ) Notice: Subject to any disclaimer, the term of this patent is extended or adjusted under 35 U.S.C. 154(b) by 117 days.

(21) Appl. No.: 15/566,951

(22) PCT Filed: Apr. 20, 2016

(86) PCT No.: PCT/GB2016/051078
§ 371 (c)(1),
(2) Date: Oct. 16, 2017

(87) PCT Pub. No.: WO2016/170314
PCT Pub. Date: Oct. 27, 2016

(65) Prior Publication Data
US 2018/0099579 A1 Apr. 12, 2018

(30) Foreign Application Priority Data
Apr. 20, 2015 (GB) .................................. 1506657.4

(51) Int. Cl.
*B60L 11/18* (2006.01)
*H02J 7/00* (2006.01)
(Continued)

(52) U.S. Cl.
CPC ........... *B60L 11/1864* (2013.01); *B60L 58/21* (2019.02); *G05F 1/462* (2013.01); *H02J 7/0024* (2013.01);
(Continued)

(58) Field of Classification Search
CPC ......... B60L 58/21; G05F 1/462; H02J 7/0024
(Continued)

(56) References Cited

U.S. PATENT DOCUMENTS

2012/0091964 A1 4/2012 Vance et al.
2012/0206102 A1 8/2012 Okamura et al.
(Continued)

FOREIGN PATENT DOCUMENTS

EP 2 765 644 A2 8/2014
EP 2765644 A2 * 8/2014
(Continued)

OTHER PUBLICATIONS

International Search Report dated Jul. 8, 2016 for International application No. PCT/GB2016/051078.
(Continued)

*Primary Examiner* — Maceeh Anwari
(74) *Attorney, Agent, or Firm* — Fay Sharpe LLP

(57) ABSTRACT

There is provided a battery system comprising a control system (102, 131, 41) and a plurality of sub-batteries (130) that have different battery chemistries to one another, resulting in different discharge characteristics to one another. The plurality of sub-batteries (130) are connected in parallel to one another for delivering power to an output (107), wherein each sub-battery comprises a plurality of cell modules (140) for connecting in series with one another to form a series circuit. The control system is configured to switch ones of the cell modules (140) in and out of the series circuits to control how many cell modules are connected in each series circuit, thereby controlling which ones of the sub batteries contribute most power to the output (107). A method for managing the battery system is also provided.

20 Claims, 3 Drawing Sheets

(51) Int. Cl.
*G05F 1/46* (2006.01)
*B60L 58/21* (2019.01)

(52) U.S. Cl.
CPC ........... *H02J 7/0016* (2013.01); *H02J 7/0063* (2013.01); *H02J 2007/0067* (2013.01); *Y02T 10/7005* (2013.01); *Y02T 10/7055* (2013.01); *Y02T 10/7061* (2013.01)

(58) Field of Classification Search
USPC .......................................................... 701/22
See application file for complete search history.

(56) References Cited

U.S. PATENT DOCUMENTS

2012/0256568 A1  10/2012  Lee
2013/0141045 A1   6/2013  Karim et al.

FOREIGN PATENT DOCUMENTS

| FR | 3010250 A1 * | 3/2015 |
| WO | WO 2009/111478 A2 | 9/2009 |
| WO | WO 2012/038210 A2 | 3/2012 |
| WO | WO 2015/032874 A1 | 3/2015 |

OTHER PUBLICATIONS

Written Opinion dated Jul. 8, 2016 for International application No. PCT/GB2016/051078.
British Search Report dated Oct. 27, 2015 for Application No. GB 1506657.4.

* cited by examiner

BATTERY SYSTEM COMPRISING A CONTROL SYSTEM

The present invention relates to a battery system, for example for use in electric or hybrid electric vehicles (EV).

BACKGROUND OF THE INVENTION

A battery system for an EV for example has a requirement to provide high performance under acceleration, start under load in initially cold or hot conditions, provide a long endurance service life, provide a high energy density to minimise overall weight, and survive a suitable warranty period without defect, as well as being as affordably priced as possible. EV battery packs currently in the market consist of multiple cells of a chosen cell chemistry, with a performance tailored as the best compromise of all the above characteristics.

Typically each type of cell chemistry has a particular internal impedance or electrical series resistance (ESR) that varies according to the rate of charge/discharge, and the temperature or age of the cells, and these generally differ from cell chemistry to cell chemistry.

A single cell chemistry cannot be tailored to be excellent in every respect, and a cell manufacturer working to improve cell performances in terms of range, lifespan and cost, may compromise on say charging efficiency. To help mitigate the drawbacks of individual cell chemistries, US 2013/0141045 discloses a battery pack with a main battery having a chemistry suited for a high power delivery, and a supplemental battery having a chemistry providing high energy density storage. The main and supplementary batteries are switched between and the main battery is used in preference to the supplementary battery.

Although, switching to the main battery in preference to the supplementary battery can result in the main battery becoming too depleted, requiring the supplementary battery to be used in place of the main battery and temporarily losing the benefit of the main battery until the battery pack can be recharged. For example, once the main battery becomes depleted, the ability of the vehicle to accelerate quickly may be significantly affected, even when a large charge still remains in the supplementary battery.

It is an aim of the invention to provide a more effective battery system for a comprehensive range of battery operating conditions, for example to provide a battery system that can work well in a combination of hot or cold conditions, under high power demands, that can have a high energy density, that can provide high cycle life, that can allow for partial battery replacements for lifed and/or defective cells, and optimise battery performance against cell cost. The term "lifed" as used herein refers to a cell which has significantly degraded in its performance over time, and so requires replacement.

SUMMARY OF THE INVENTION

According to a first aspect of the invention, there is provided a battery system comprising a control system and a plurality of sub-batteries that have different battery chemistries to one another, resulting in different discharge characteristics to one another, wherein the plurality of sub-batteries are connected in parallel to one another for delivering power to an output, wherein each sub-battery comprises a plurality of cell modules for connecting in series with one another to form a series circuit, and wherein the control system is configured to switch ones of the cell modules in and out of the series circuits to control how many cell modules are connected in each series circuit, thereby controlling which ones of the sub batteries contribute most power to the output.

Accordingly, the voltage potentials of each of the sub-batteries tend to equalise with one another since they are connected in parallel, and the different discharge characteristics of the sub-batteries means that some sub-batteries supply more current (and therefore power) to the output than other sub-batteries. For example, if a first sub-battery with an off-load voltage of 13 v and an internal resistance of 1 ohm is connected in parallel with a second sub-battery with an off-load voltage of 13 v and an internal resistance of 0.5 ohm, then connecting a load to the sub-batteries which draws 1 A of current from the sub-batteries, will result in the voltage of the sub-batteries dropping to 12.66V due to the internal resistances, with 0.33 A of current being supplied from the first battery, and 0.66 A of current being supplied from the second battery, as will be apparent to those skilled in the art. For the avoidance of doubt, the off-load voltage is the voltage of the sub-battery when no current is being drawn from it.

The switching in and out of the cell modules of each sub-battery regulates the off-load voltage of the sub-battery, to control the proportion of the overall power that is delivered by the sub-battery. Continuing the example above, if the contribution from the first sub-battery is to be increased, then the off-load voltage of the first sub-battery can be raised by switching in another cell module into the series circuit of the first sub-battery, so the off-load voltage of the first sub-battery is raised from 13V up to for example 13.5V. Then, the voltages of the sub-batteries will drop to 12.833V due to the internal resistances when the 1 A load is connected, with 0.66 A of current being supplied from the first sub-battery, and 0.33 A being supplied from the second sub-battery.

Therefore, the switching of cell modules allows each sub-battery to become more dominant by switching in more cell modules into the series circuit of the sub-battery, or to become less dominant by switching out cell modules from the series circuit of the sub-battery. Accordingly, the switching allows the relative proportions of power from each of the sub-batteries to be controlled. The control system preferably comprises a battery control unit that is configured to monitor an overall state of charge of the battery system, and the states of charge of the individual sub-batteries, and control the switching of the cell modules based thereon.

The ability to alter which sub-batteries dominate in the supply of power to the output allows the battery system to operate more efficiently, utilising the discharge characteristics of a particular type of sub-battery in operating situations or environments best suited to that discharge characteristic. Therefore, a plurality of sub-batteries having different discharge characteristics to one another may be implemented, with the sub-battery that has the discharge characteristic most suited to present demands being switched to dominate in the supply of power to the output. The different discharge characteristics correspond to different cell chemistries. More than one sub-battery may be implemented for one or more of the cell chemistry types.

Simply connecting two batteries of the same initial voltage potential but different cell chemistries in parallel, without utilising the switching of the present invention, would typically result in one of the batteries being dominant, and would not effectively load share with the other battery of a different cell technology. Accordingly, connecting batteries of different chemistries in parallel with one another is not typically done, and battery manufacturers typically warn against using different types of battery cells in combination with one another. For example, in a battery system comprising two sub-batteries, one with a cell chemistry tailored to high discharge rates and the other with cells tailored for high capacity, if the sub-batteries were connected in parallel and put under high load, then the power delivered by the system would be predominantly drawn from the high discharge rate cells, with a gradually increasing share from the high capacity cells, until the high discharge rate cells were fully discharged, in which case the high capacity cells would not be capable of maintaining the high load, and prematurely shut down.

However, the use of switching according to the present invention enables the share from the high discharge rate cells to be limited, by switching out cell modules from the sub-battery having the high discharge rate cells, and thereby preserving the ability of the battery to deliver a high discharge current when required. For example, during a high discharge current, the high discharge rate capable sub-battery could reduce its number of series connected cell modules, such that its effective off load voltage was reduced. Then, the miss-match in internal resistances of the two sub-battery technologies would allow both sub-batteries to have a more balanced discharge, supplying power to the load proportionally to their capacities. The more series cells that were disconnected by the high discharge rate sub-battery, the more power the high capacity cells would be forced to provide.

According to a second aspect of the invention, there is provided a method of managing a battery system, the battery system comprising a control system and a plurality of sub-batteries that have different battery chemistries to one another, resulting in different discharge characteristics. The plurality of sub-batteries are connected in parallel to one another for delivering power to an output, wherein each sub-battery comprises a plurality of cell modules for connecting in series with one another to form a series circuit, and wherein the control system is configured to switch ones of the cell modules in and out of the series circuits to control how many cell modules are connected in each series circuit, thereby controlling which ones of the sub batteries contribute most power to the output. The method comprises measuring the output power of the battery and switching the cell modules so that the sub-battery having the chemistry most suited to the measured output power contributes most power to the output.

The method may comprise switching the cell modules to charge a first one of the sub-batteries up from a second one of the sub-batteries in response to detecting that the first one of the sub-batteries has a sufficiently lower state of charge than the second one of the sub-batteries. This may for example be done if the load is removed, with the increased off-load voltage of a high capacity sub-battery being used to recharge a high discharge rate sub-battery, adding in more series cell modules as the high discharge rate sub-battery becomes charged.

The switching can be controlled to determine how many cell modules in a sub-battery are connected in series and therefore the level of contribution any sub-battery may have to the receipt or delivery of charge. For example, in cold weather, the battery system may configure the sub batteries such that a sub battery having a chemistry suitable for cold temperatures has more series cell modules switched in than the other sub-batteries and supplies the dominant portion of power. Alternatively a sub-battery module with a cell chemistry suited for high cycle life could be configured to provide the dominant portion of power with the alternative chemistry sub-batteries switched to provide a higher percentage of power during periods of high demand or as the battery becomes depleted.

A sub-battery with high energy density, or a combination of sub-batteries, could be switched to supply charge current to other sub-batteries, as well as potentially powering the load. For example, the battery control unit may detect when one of the sub-batteries has a low state of charge, and in response switch the cell modules of the battery system so as to charge the sub-battery having the low state of charge. This could be achieved by switching at least one cell module out of the series circuit of the sub-battery having the low state of charge, or by switching at least one cell module into the series circuits of at least one of the other sub-batteries, so that the sub-battery having the low state of charge draws current from the other sub-batteries.

Any cell module within a sub-battery may be switched and cycling modules in and out would also be a process of maintaining cell balancing within a cell module. Cell module switching also provides the ability of the battery pack to isolate defective cells without significantly effecting the overall capacity of the battery.

Advantageously, the battery control unit may be configured to indicate the number of cell modules which should be connected in the series circuit of each one of the sub-batteries, and each sub-battery may comprise a sub-battery control unit configured to receive the indication of the number of cell modules, and to determine which cell modules are to be connected in the series circuit to make up the indicated number. Accordingly, control over which particular cell modules are connected into the series circuit may be delegated to the sub-battery control unit.

The sub-battery control unit may be configured to continually and sequentially re-select the indicated number of cell modules from the overall number of cell modules, to maintain all the cell modules at similar levels of charge to one another. Defective cell modules may also be detected by the sub-battery control unit and excluded from being selected.

Each cell module may comprise a cell control unit of the control system, the cell control unit configured to receive instructions from the relevant sub-battery control unit, and switch the cell module in and out of the corresponding series circuit according to the instructions.

DETAILED DESCRIPTION

Embodiments of the invention will now be described by way of non-limiting example only and with reference to the accompanying drawings, in which.

The figures are not to scale, and same or similar reference signs denote same or similar features.

Figure 1:
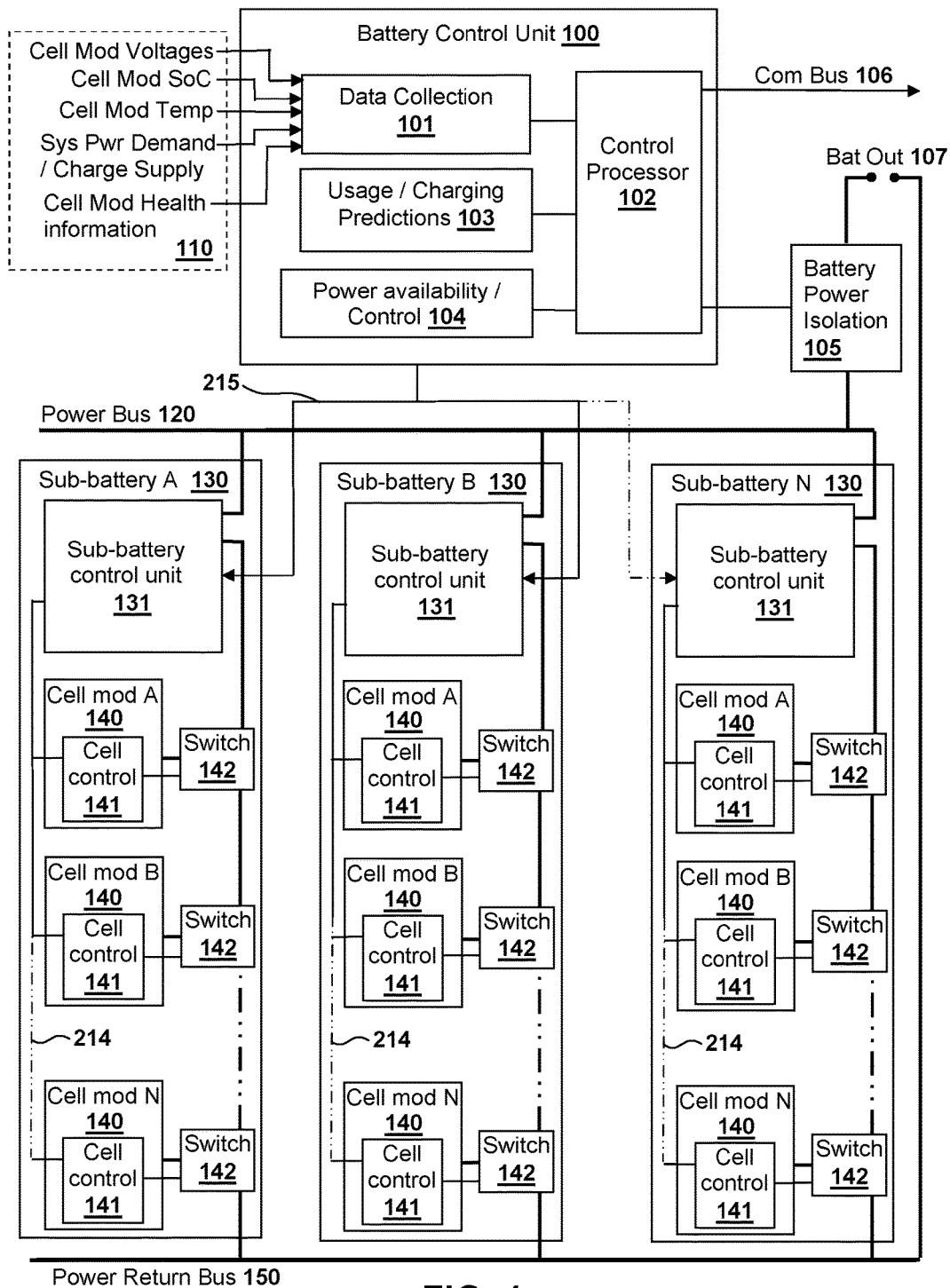
FIG. 1 shows a block diagram of a battery system according to an embodiment of the invention.

The block diagram of FIG. 1 shows a battery system with a battery control unit 100. The battery control unit 100 comprises a control processor 102 that is connected to a data collection unit 101, a usage/charging prediction unit 103, and a power availability/control unit 104. The control processor 102 is also connected to a communication bus 106, and sends information on the current status of the battery system to the communication bus 106, to inform any connected devices about the state of the battery system. For example, in one embodiment the battery system illustrated in FIG. 1 forms part of an EV, and the communication bus 106 sends information on the overall state of charge of the battery system, for display to the driver of the vehicle.

The battery control unit 100 is connected to a sub-battery communications bus 215, and the sub-battery communications bus 215 is connected to a sub-battery control unit 131 of each one of N sub-batteries 130. The battery system may comprise a large number of sub-batteries 130, for example N=12 different sub-batteries in one example, although N could be as low as 2 for a simple battery system.

The battery system has an output 107 for output of electrical power from the battery system. The control processor 102 of the battery control unit 100 is connected to battery power isolation unit 105. The battery power isolation unit 105 is a main contactor or other suitable power switching device, so that the output 107 can be isolated from the battery if and when required.

The battery power isolation unit 105 is connected to a power bus 120, and the sub-batteries 130 are connected between the power bus 120 and a power return bus 150 in parallel with one another, so that the sub-batteries 130 are all forced to a similar voltage level to one another.

The sub-battery control unit 131 of each sub-battery is formed by a microcontroller, memory unit, and power isolation unit. In addition to being connected to the sub-battery communications bus 215, each sub-battery control unit 131 is also connected to a cell module communications bus 214. The cell module communications bus 214 is connected to a cell module control unit 141 of each cell module of the sub-battery, so the sub-battery control unit 131 can communicate with the cell modules 140.

The cell modules of each sub-battery are connected in series with one another, forming a series circuit that is connected from the power bus 120 to the power return bus 150. Each cell module is connected to a respective switch 142 of the sub-battery, for switching the cell module in and out of the series circuit. Clearly, switching an additional cell module 140 into the series circuit will result in a greater off-load voltage being presented to the power bus 120 by the sub-battery 130, increasing the proportion of current that is supplied by the sub-battery compared to the other sub-batteries when the output 107 is loaded.

The sub-battery control unit 131 processes data received from the cell modules 140, such as state of discharge information, and collates and sends the information to the battery control unit 100 via the sub-battery communications bus 215.

The data collection unit 101 collects data 110 from each of the sub-batteries 130 via the sub-battery communications bus 215, as well as operational data from the EV and operating environment, including external temperature, recent power demand information, vehicle acceleration/deceleration, charge supply in order to determine/predict the requirements 103 of power demand/charge from each sub-battery.

The control processor 102 processes the collected data 101, and provides power availability calculations including calculating the overall state of charge of the battery system.

Although FIG. 1 shows the battery system as having three sub-batteries 130, sub-battery N represents the ability for any practical number of sub-batteries to be implemented within the battery system. At least two of the sub-batteries are formed of different technologies or chemistries to one another, such that they have different discharge characteristics to one another.

Although FIG. 1 shows each sub-battery 130 as having three series cell modules 140, cell module N represents the ability for any practical number of cell modules to be implemented within each sub-battery. The greater the number of cell modules, the greater the flexibility in fine-tuning the off-load voltage of the battery pack, to fine-tune the share of power that the sub-battery contributes to the overall power output of the battery. A higher number of cell modules also helps to limit the impact on the sub-battery of a cell module that becomes faulty.

Figure 2:
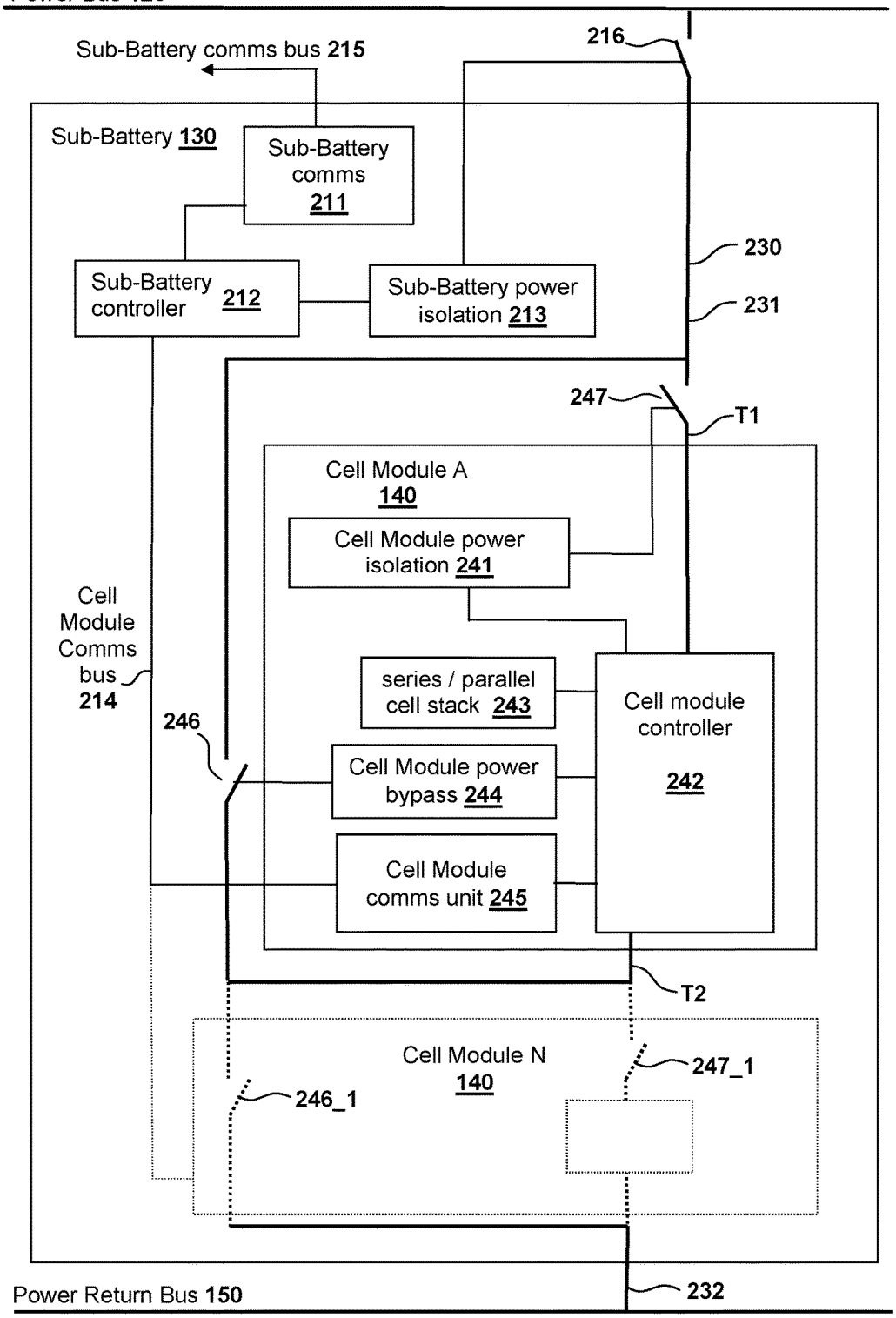
FIG. 2 shows a block diagram of a sub-battery forming part of the FIG. 1 embodiment.

A more detailed view of each sub-battery 130 and its cell modules 140 is shown in FIG. 2. The sub-battery control unit 131 comprises a sub-battery communications module 211, a sub-battery controller 212, and a sub-battery power isolation control 213. The sub-battery communications module 211 is connected to the sub-battery communications bus 215 for communicating therewith, and is also connected to the sub-battery controller 212. The sub-battery controller 212 is connected to the cell module communications bus 214, and to the sub-battery power isolation control 213.

The sub-battery power isolation control 213 controls a switch 216 which is connected between the power bus 120 and a first end 231 of the series circuit 230 of the sub-battery. The switch 216 can be used to isolate the series circuit of the sub-battery from the power bus 120 if required, for example if there is a malfunction with the sub-battery, or if the sub-battery is not required to supply any power to the power bus 120 at all. The switch 216 may be a mechanical device such as a contactor, or an electronic power isolation device, such as a power MOSFET or similar.

The sub-battery controller 212 collects information or receives commands from the battery control unit 100, via the sub-battery communications module 211 and sub-battery communications bus 215. The sub-battery controller 212 also collects information or receives commands from each of the cell modules 140 via the cell module communications bus 214. The sub-battery controller 212 controls the sub-battery power isolation 213, 216, based on the information received from the battery control unit 100 and the cell modules 140.

The sub-battery comprises a number of cell modules 140 that may be switched in and out of a series string of cell modules, the number of cell modules that are switched into the series string of cell modules, the higher the off-load voltage of the sub-battery 130. The cell modules are all substantially the same as one another, and so only the top cell module "Cell Module A" is shown in detail in FIG. 2.

Each cell module has two power terminals, T1 and T2, which connect the cell module in series within the series circuit so the cell module can deliver electrical power to the series circuit 230. The series circuit 230 has the first end 231, and a second end 232, with the cell modules being switched in or out between these two ends. The first end 231 is connected to the power bus 120 via the switch 216, and the second end 232 is connected to the power return bus 150.

To effect the switching in and out of the cell modules, each cell module is connected to a power isolation switch 247 between the series circuit 230 and the cell module, for connecting or isolating the cell module from the series circuit. Each cell module is also connected to a power bypass switch 246 that is electrically connected to the series circuit 230 above and below the cell module. The power bypass switch 246 is closed to bypass the cell module in the event that the power isolation switch 247 is opened to isolate the cell module from the series circuit, thereby maintaining continuity of the series circuit between the first and second ends 231 and 232. The switches 246 and 247 collectively form the switch 142, and could be implemented as one double-throw switch rather than two separate switches if desired.

The switches 142 are controlled by the cell module on demand from the sub-battery, or as a result of fault detection and are of a suitable technology (Mosfets, BJT's, contactors or any other mechanical or electrical power switching device). The power bypass switches 247 allow the cell module to isolate its cells from the series connected string of modules and connect the modules above and below in a series configuration to maintain continuity and bypass the switched out cell module. Electronic protection may be incorporated to allow uninterrupted supply from the sub-battery whilst switching in and out of a cell module takes place.

The top cell module "Cell Module A" can be switched into the series circuit 230 by closing the power isolation switch 247 to connect it to the first end 231 of the series circuit 230, and by opening the power bypass switch 246. If the top cell module is switched out of the series circuit by opening the power isolation switch 247 and closing the power bypass switch 246, then the next cell module down will connect to the first end 231 of the series circuit via the power bypass switch 246, and so on. Any number of cell modules may be bypassed. The bottom module "Cell Module A" can be switched in by closing the power isolation switch 247_1 and opening the power bypass switch 246_1, or switched out by opening the power isolation switch 247_1 and closing the power bypass switch 246_1 to connect the series circuit to the to the power return bus 150.

Each cell module 140 comprise a series/parallel cell stack 243, which stores the electrical charge held by the cell module. The series/parallel cell stack 243 is made up of cells of a single cell technology or chemistry, for example but not limited to; Lithium ion, Lithium Sulphur, Lithium Manganese Cobalt, Lithium Titanate. The number of series and/or parallel cells can range from 1 upwards, depending on the requirements of the battery system and a practical configuration for the sub-battery, determined by the needs of a particular battery application.

Each series/parallel cell stack 243 comprises a plurality of chains connected in parallel to one another, each chain comprising a plurality of cells connected in series to one another. The more cells in series, the larger the voltage drop on the sub-battery when a cell module is removed from the series string. The more cells in parallel, the fewer the number of cell modules would be required to maintain the capacity requirements of the battery pack.

Each cell module control unit 141 comprises a cell module controller 242, a cell module communications unit 245 that connects to the cell module communications bus 214, and power isolation 241 and power bypass 244 controllers that control the switches 246 and 247. The cell module controller 242 is a processor that monitors the state and heath of the cells within the cell stack 243, and that receives commands from and sends data to the sub-battery controller 212, via the communications unit 245 and the bus 214.

The cell module controller 242 controls the power isolation 241 and power bypass 244 to switch the switches 246 and 247. Electronic control is implemented to ensure that the bypass switch 246 is closed when the isolation switch 247 is opened in a manner that prevents a situation where the string of power modules goes open circuit, or the cell module is shorted out. Optionally, the sub-battery controller 212 may isolate the sub-battery from the power bus 120 using switch 216 whilst the switching is carried out, to prevent switching under load.

Accordingly, each sub-battery has the ability to switch any individual cell module out of the series string of cell modules by isolating its supply and effectively shorting across the cell module to connect the negative T2 of the cell module above, to the positive T1 of the cell module below. Suitable protection electronics may be implemented in both the cell modules and sub-batteries to protect against potential component faults and failures. If a fault is detected within a cell module, the cell module can be isolated and the sub-battery continue to operate although at a lower voltage. Compensation may be provided by the battery pack control module in ordering the other sub-batteries to reduce their number of sub-batteries when there is a requirement to draw power from the faulty sub-battery.

The sub-battery controller 212 may receive from the battery control unit 100 via the bus 215 a command to connect an indicated number of cell modules into the series circuit 230. The indicated number of cell modules may be specified in terms of an off-load voltage that the sub-battery is to provide. The sub-battery controller then selects the indicated number of cell modules 140 to be switched into the series circuit 230, and instructs the selected cell modules via the bus 214 to switch themselves into the series circuit 230 by operating the switches 246, 247 to which they are connected.

Cell modules that have been removed from the series string of cell modules, may be swapped in cyclically with other cell modules which may be removed, in order to maintain a state of charge balance across all cell modules. For example, a sub-battery that is required to operate by reducing the number of series cell modules from 10 down to 9, may see cell module 1 removed for say 5 seconds, then switched in while cell module 2 is removed for 5 seconds, then module 3 and so on until returning to module 1 where the cycle repeats, or the sub-battery is ordered to connect in all 10 cell modules. If two or more modules are required to switch out, then the same number will be switched each 5 seconds. Accordingly, the indicated number of cell modules are continually and sequentially re-selected from the overall number of cell modules to maintain the cell modules at similar levels of charge to one another. Clearly alternative timings to those given above may be implemented in alternate embodiments.

If a fault is detected within a cell module, the sub-battery control unit logs the cell module as a defective cell module, and selects the indicated number of cell modules only from non-defective cell modules.

The battery system can manage the supply of power from any sub-battery such that certain sub-battery types can be depleted in priority depending on usage, thus ensuring that the best sub-battery for the task is depleted first. Cells with good low temperature performance can be dominant when it is cold, cells with high specific power can be dominant during acceleration, cells with high energy density can act as a reserve, and cells with good endurance can dominate under normal running conditions.

Figure 3:
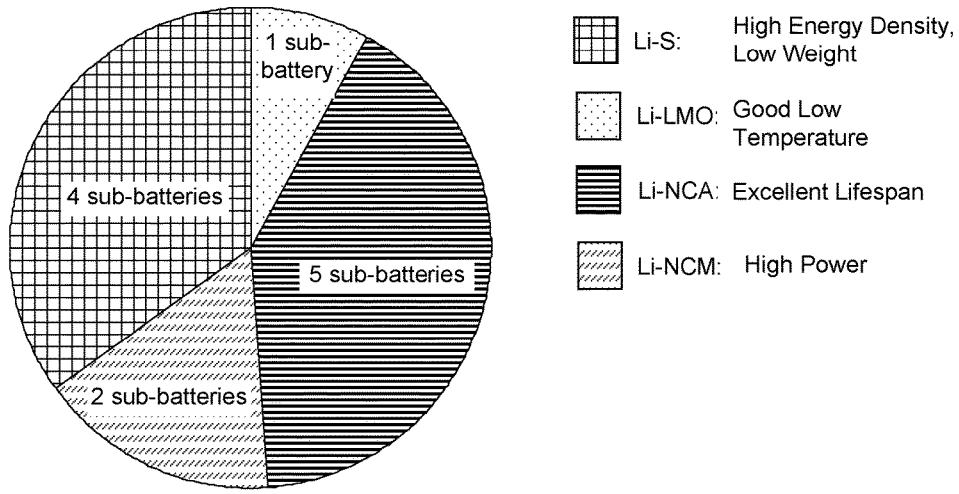
FIG. 3 shows a pie chart of the proportions of cell chemistries used in a battery system according to one implementation of the FIG. 1 embodiment.

FIG. 3 depicts a possible battery arrangement comprising 12 of the sub-batteries 130, wherein 1 sub battery may contain a cell chemistry suited to low temperature, 2 sub-batteries may contain a cell chemistry suited to delivering high power, 4 sub-batteries may contain a cell chemistry to provide high energy density, and 5 of the sub-batteries may contain a cell chemistry suited for high endurance and cycle life.

Depending on the current power demand or environmental conditions, the battery control unit 100 sends commands to the individual sub-batteries in order to switch in or out power modules, effectively controlling the dominance of any of the sub-battery chemistry types.

In an automotive application for example, the majority of electric car owners may only use up to 40% of the battery capacity before re-charging, therefore the battery control unit may control the switching of the cell modules in each sub-battery so that sub-batteries having long life cells dominate when the overall battery has greater than 60% charge, and therefore deplete in preference to other cell types.

Figure 4:
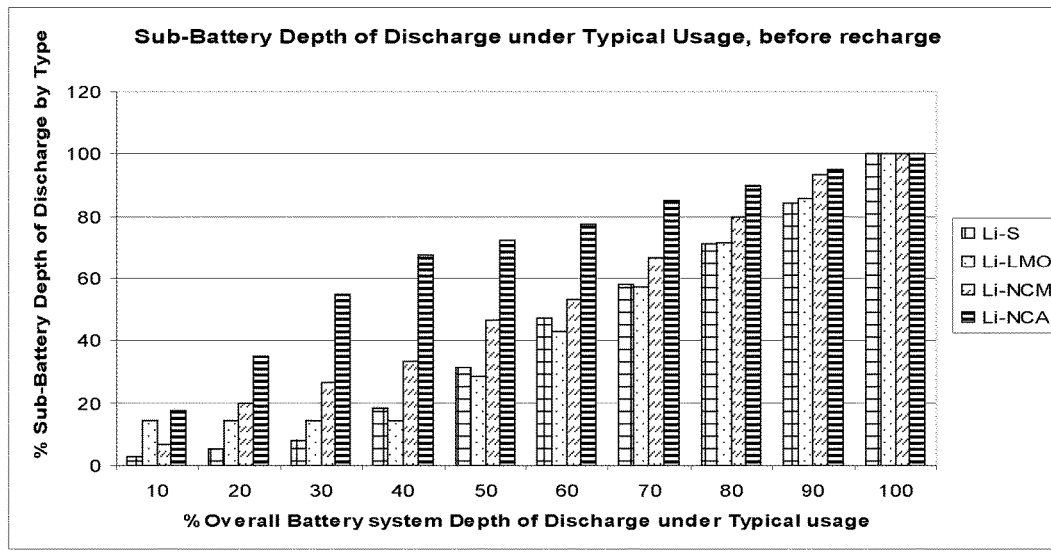
FIG. 4 shows a graph of sub-battery states of charge as the battery system of FIG. 3 is discharged.

FIG. 4 indicates how any particular cell technology may be dominantly discharged during usage of an automotive battery. Cold starting may require dominance from cell chemistries suited to cold temperature and high power, so a battery that is discharged by the first 10% may take a higher portion from cells tailored for cold, power and endurance. The next 30% of the battery discharge may see a much higher portion of the power taken from high endurance cells (which may be depleted by more than 60%). If the battery is charged at this point, the high endurance cells would have been depleted by over 60%, whereas the high power cells may have been depleted by 30%, cold start cells by 15% and high energy density cells by 20%. As the battery is depleted further, demand from the other cell technologies will catch up such that when the battery is fully depleted, all cell technologies shall have been switched to ensure they have all been fully utilised.

Many other variations of the described embodiments falling within the scope of the invention will be apparent to those skilled in the art.

The invention claimed is:

1. A battery system comprising a control system and a plurality of sub-batteries that have different battery chemistries to one another, resulting in different discharge characteristics, wherein the plurality of sub-batteries are connected in parallel to one another for delivering power to an output, wherein each sub-battery comprises a plurality of cell modules for connecting in series with one another to form a series circuit, and wherein the control system comprises a battery control unit configured to switch ones of the cell modules in and out of the series circuits to control how many cell modules are connected in each series circuit, thereby controlling which ones of the sub batteries contribute most power to the output, wherein the battery control unit is configured to deliver the most power to the output from the sub-batteries that have the battery chemistry that is best suited to a current operating situation or environment of the battery system.

2. The battery system of claim 1, wherein the battery control unit is further configured to monitor an overall state of charge of the battery system, and to control the switching of the cell modules in and out of the series circuits based on the overall state of charge.

3. The battery system of claim 1, wherein the battery control unit is further configured to monitor a state of charge of each one of the sub-batteries, and to control the switching of the cell modules in and out of the series circuits further based on the states of charge of the sub-batteries.

4. The battery system of claim 1, wherein the battery control unit is further configured to detect when one of the sub-batteries has a low state of charge, and in response to switch at least one cell module out of the series circuit of the sub-battery having the low state of charge, or to switch at least one cell module into the series circuits of at least one of the other sub-batteries, to recharge the sub-battery having the low state of charge from at least one of the other sub-batteries.

5. The battery system of claim 1, wherein the battery control unit is further configured to monitor an overall temperature of the battery system or ambient environment, wherein one of the sub-batteries has a lower temperature rating than another one of the sub-batteries, and wherein the battery control unit is configured to switch the cell modules to contribute more of the power to the output from the sub-battery having the lower temperature rating in response to a falling temperature.

6. The battery system of claim 1, wherein one of the sub-batteries has a higher maximum discharge current rating than another one of the sub-batteries, and wherein the battery control unit is configured to switch the cell modules to contribute more of the power to the output from the sub-battery having the higher maximum discharge current rating in response to an increasing discharge current at the output.

7. The battery system of claim 1, wherein each sub-battery comprises a sub-battery isolation switch for isolating the series circuit of the sub-battery from the remaining ones of the plurality of sub-batteries connected in parallel to one another.

8. The battery system of claim 1, wherein each sub-battery comprises a sub-battery control unit of the control system, the sub-battery control unit configured to control which ones of the cell modules of the sub-battery are switched into the series circuit of the sub-battery.

9. The battery system of claim 8, wherein each sub-battery comprises a respective overall number of cell modules of the sub-battery, wherein each sub-battery control unit is configured to receive an indicator of a number of cell modules that are to be connected in the series circuit of the corresponding sub-battery, to select the indicated number of cell modules from the overall number of cell modules, and to connect the selected cell modules into the series circuit.

10. The battery system of claim 9, wherein the indicated number of cell modules are continually and sequentially re-selected from the overall number of cell modules to maintain the cell modules at similar levels of charge to one another.

11. The battery system of claim 9, wherein the sub-battery control unit is configured to log defective cell modules of the corresponding sub-battery, and to only select the indicated number of cell modules from non-defective cell modules.

12. The battery system of claim 1, wherein each cell module comprises a plurality of chains connected in parallel to one another, each chain comprising a plurality of cells connected in series to one another.

13. The battery system of claim 1, wherein each cell module is connected to bypass and isolation switches for switching the cell module in and out of the corresponding series circuit.

14. The battery system claim 1, wherein each cell module comprises a cell control unit of the control system, the cell control unit configured to receive instructions, and switch the cell module in and out of the corresponding series circuit according to the instructions.

15. The battery system of claim 1, wherein the control system determines which battery chemistry is best suited to the current operating situation or environment of the battery system.

16. The battery system of claim 1, wherein one of the sub-batteries has a chemistry suited to colder temperature operation than a chemistry of another one of the sub-batteries, wherein the battery control unit is configured to monitor an overall temperature of the battery system or ambient environment, and in response to a low overall temperature of the battery system or ambient environment, to switch the cell modules in and out of the series circuits to contribute most power to the output from the sub-battery suited to colder temperature operation.

17. An electric or hybrid electric vehicle, comprising:
a battery system comprising:
  a control system; and,
  a plurality of sub-batteries that have different battery chemistries to one another, resulting in different discharge characteristics,
  wherein the plurality of sub-batteries are connected in parallel to one another for delivering power to an output, wherein each sub-battery comprises a plurality of cell modules for connecting in series with one another to form a series circuit, and wherein the control system comprises a battery control unit configured to switch ones of the cell modules in and out of the series circuits to control how many cell modules are connected in each series circuit, thereby controlling which ones of the sub batteries contribute most power to the output, wherein the battery control unit is configured to deliver the most power to the output from the sub-batteries that have the battery chemistry that is best suited to a current operating situation or environment of the battery system.

18. A method of managing a battery system, the battery system comprising a control system and a plurality of sub-batteries that have different battery chemistries to one another, resulting in different discharge characteristics, wherein the plurality of sub-batteries are connected in parallel to one another for delivering power to an output, wherein each sub-battery comprises a plurality of cell modules for connecting in series with one another to form a series circuit, and wherein the control system is configured to switch ones of the cell modules in and out of the series circuits to control how many cell modules are connected in each series circuit, thereby controlling which ones of the sub batteries contribute most power to the output, wherein the method comprises measuring the output power of the battery and switching the cell modules so that the sub-battery having the chemistry most suited to the measured output power contributes most power to the output.

19. The method of claim 18, wherein the battery system comprises a sub-battery having a higher energy density rating than another one of the sub-batteries, and wherein the method comprises switching the cell modules to contribute more of the power to the output from the sub-battery having the higher energy density rating in response to a falling discharge current at the output.

20. The method of claim 18, wherein the method comprises switching the cell modules to charge a first one of the sub-batteries up from a second one of the sub-batteries in response to detecting that the first one of the sub-batteries has a sufficiently lower state of charge than the second one of the sub-batteries.

* * * * *